Feb. 7, 1939.  P. H. FLAUTT  2,146,501
HEAT CONTROL APPARATUS
Filed Nov. 14, 1933   5 Sheets-Sheet 1
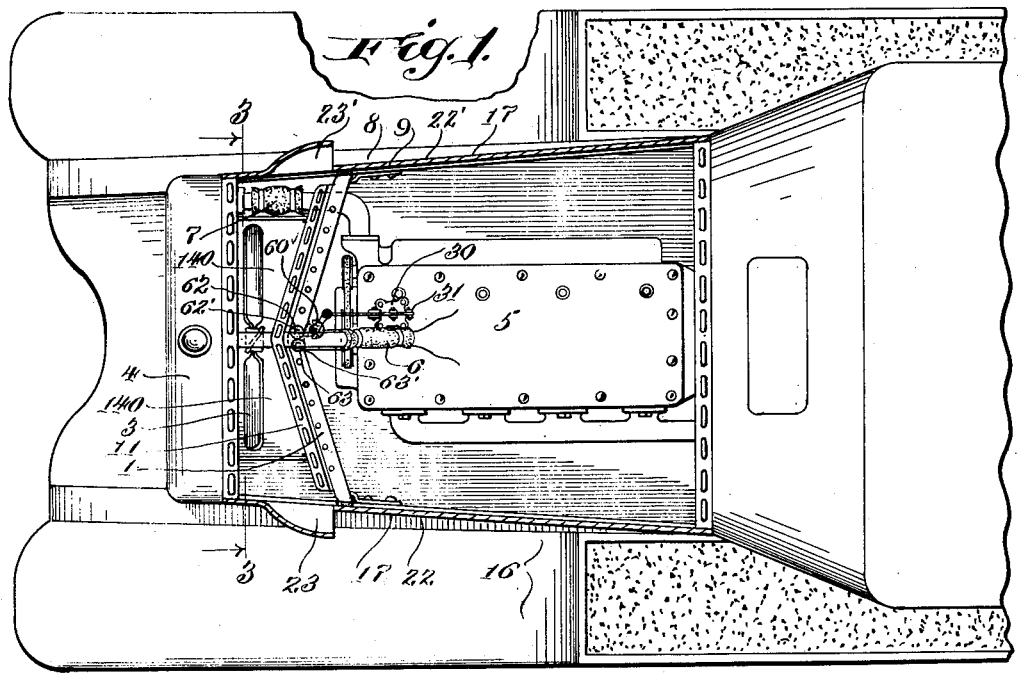
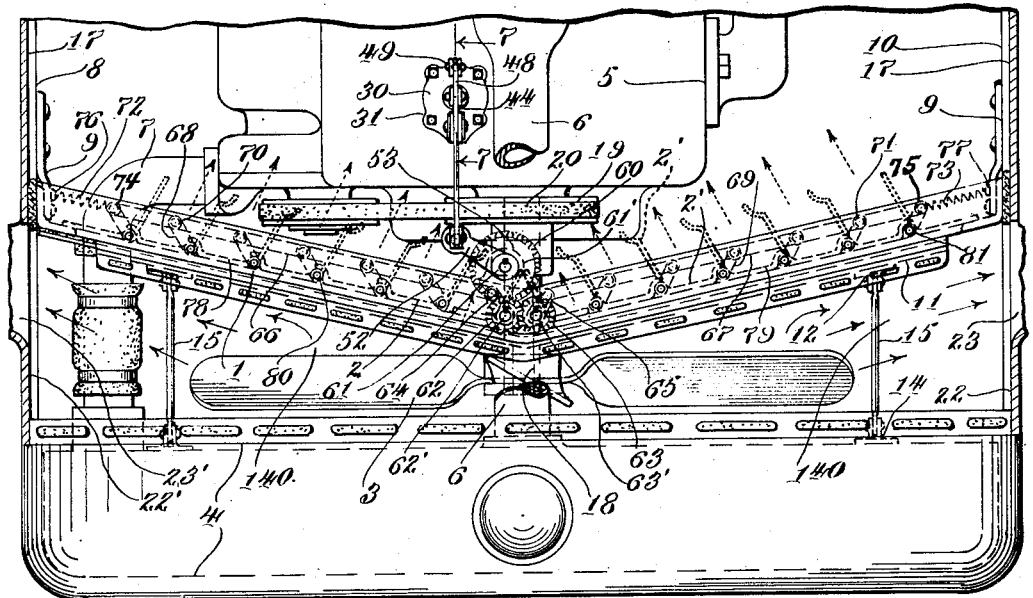

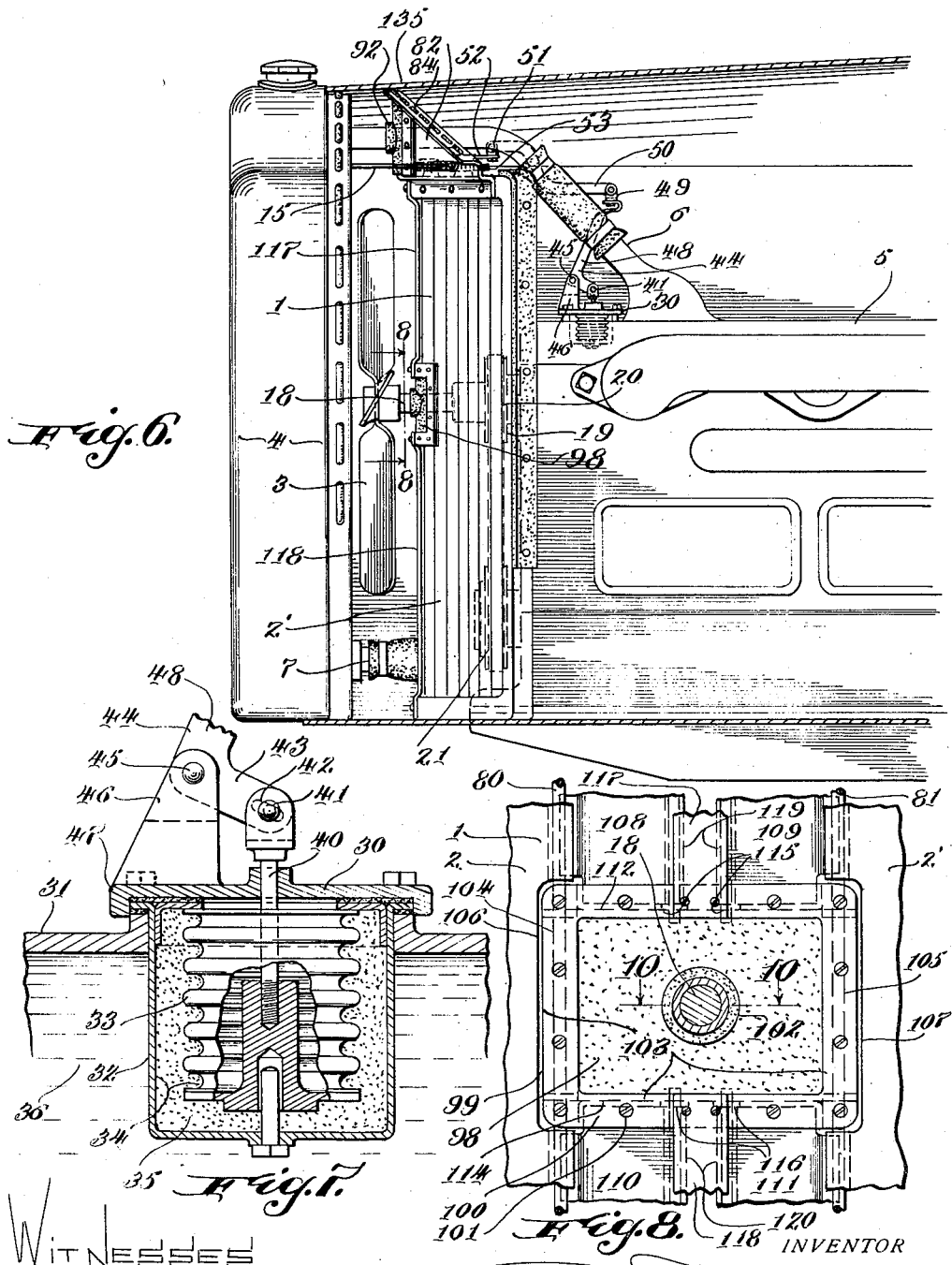

Feb. 7, 1939. P. H. FLAUTT 2,146,501
HEAT CONTROL APPARATUS
Filed Nov. 14, 1933 5 Sheets-Sheet 4
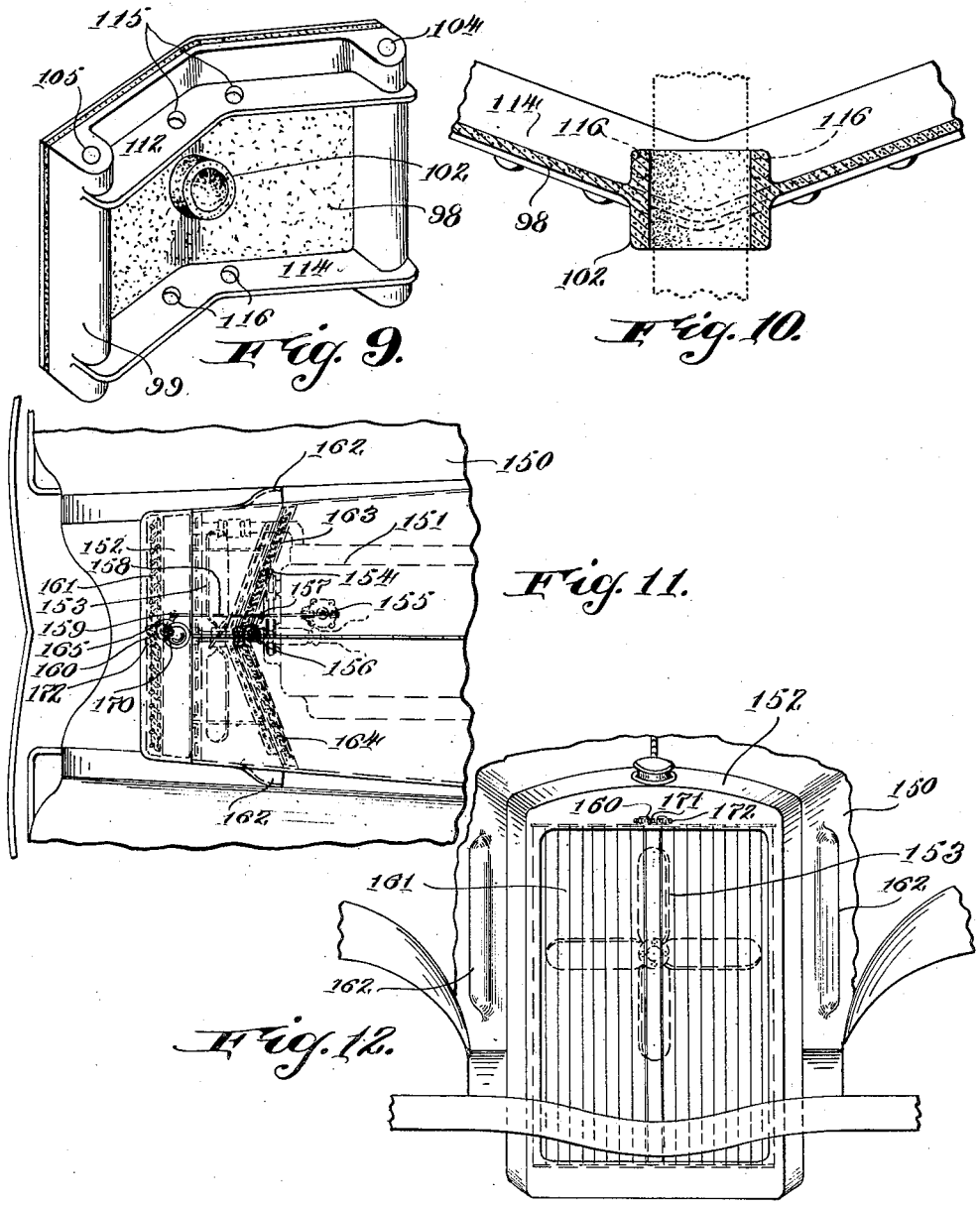

Feb. 7, 1939.   P. H. FLAUTT   2,146,501
HEAT CONTROL APPARATUS
Filed Nov. 14, 1933   5 Sheets-Sheet 5

Patented Feb. 7, 1939

2,146,501

UNITED STATES PATENT OFFICE 2,146,501

HEAT CONTROL APPARATUS

Porter H. Flautt, Baltimore, Md., assignor of one-half to Frederick C. Reitze and one-fourth to K. Byrne Timberlake, Catonsville, Md.

Application November 14, 1933, Serial No. 697,947

8 Claims. (Cl. 123—174)

The present invention relates to a heat control method and apparatus, that is particularly adaptable to be used in combination with internal combustion motors of various types, for purposes of maintaining the same at efficient working temperatures, regardless of the external temperatures due to either hot or cold atmospheric conditions, usually brought about by changes in the seasons and weather conditions, and is especially adaptable to that type of combustion motor usually found in use in the automative industry for self propelled vehicles, such as the various types of pleasure and business cars, light and heavy duty trucks, and tractors of different types for miscellaneous purposes and duties.

As is well known, the automotive industry has been having great difficulty with combustion motors in respect to both heating and cooling this type of motor to the extent that the same may be maintained at a substantially even working temperature that is of a degree that is particularly efficient for the respective type of combustion motor whose temperature it is desired to control. Various devices have been tried and are now being used on the present day automotive combustion motor to maintain the same at an efficient predetermined working temperature without success as to the proper degree of efficiency in respect to motor temperature of a substantially predetermined operating temperature. This is particularly true as to the water cooled type of combustion motor, wherein the same is provided with a water cooling radiator in the front of the motor or vehicle on which the motor is mounted, together with a radially bladed cooling fan that is interposed between the motor and the radiator for purposes of directing a blast of cooling air directly upon the motor and its various parts, this cooling air in practically every instance being under pressure due to the high speed of the fan as to its revolutions per minute. This type of cooling means has proven itself to be lacking in efficiency both in the past and also at the present time regardless of the present type of modern combustion motor used in the automotive industry for vehicles, with its various thermostatically controlled water cooling systems and radiator louver or shutter controls and the different types of speed controls for the cooling fan. Fan speed controls have proven to be undesirable by the motoring public, due to the fact that they become noisy in a short time, are constantly giving trouble from an operating standpoint, are expensive to manufacture and maintain and due to the unusual number of speeds necessary to meet the varying temperatures of the motor they have proven to be impractical.

Regardless of the water temperature control devices used today in the radiator circulating systems the average motorist has the greatest trouble and difficulty in having his motor reach a proper running temperature. In cold weather this blast of cold air under pressure delivered directly onto the motor causes the motor to run practically at all times at a low or cool temperature. Thus the motorist is compelled to drive with what is known as a "cold motor", consuming an unusual amount of gasoline and with well known disastrous results to the motor proper. Due to this particular condition as set forth above, the motor car manufacturers are compelled to make their respective cooling fans of a minimum size to offset this winter driving condition as much as possible, with the obvious result that in hot weather and under unusual driving conditions the minimum size fan is not large enough, and the motor overheats, and as may be readily understood the reverse condition would result if the motor were provided with an over size fan.

It is the purpose of the present invention to provide a method and apparatus whereby automotive combustion motors may be operated at efficient temperatures in a manner that is independent of either unusual hot or cold weather conditions, and at the same time overcome the various deficiencies in temperature control for combustion motors as set forth above.

A specific object of the present invention is to provide means interposed between the radially bladed cooling fan of a combustion motor and the blast of cooling air delivered therefrom, and the combustion motor block proper, said interposed means being provided with means for intercepting and diverting as well as converging predetermined quantities, in proportionate amounts to substantially predetermined motor temperatures, of the said air blast from the cooling fan, both away from and onto the motor proper.

A further object of the present invention is to provide means to prevent automotive combustion motors from becoming watersoaked and stalling therefrom, due to rain, by diverting rain spray and water thrown off from the cooling fan, away from the motor proper, without interfering with the cooling of the motor or its temperature control under such condition.

Another feature and object of the present invention is to provide means whereby the blast of cooling air from the motor fan may be diverted in opposite directions in a simultaneous manner in various proportionate quantities into the atmosphere or away from the motor proper, without perceptible resistance thereto.

Still another important feature of the present invention is to provide means whereby both the water cooling radiator and the cooling fan of a combustion motor for automobiles, are thermostatically controlled in a simultaneous manner to either increase or decrease the cooling function of each as to its effect on the temperature of the motor.

Further, another important object of the present invention is to provide means whereby the various connections such as the water hose from the radiator to the motor together with the fan drive shaft and the like may be passed through the above mentioned means that are interposed between the fan proper and the motor for intercepting the air blast from the fan, without interfering with the functioning of the same regardless of the movement of the motor due to floating power or the like, wherein the motor vibration or movement is independent of the motor frame or car chassis.

Another object of the present invention is to provide means in the form of a louvered or shuttered partition, having louver or shutter operating means, the said partition being so placed in relation to the motor and its cooling fan as to prevent the blast of cooling air from the fan reaching the motor, or allowing predetermined quantities of said blast of air to react on the motor as a cooling element.

Still another important feature of the present invention is the provision of motor temperature controlling means whereby an over size fan may be used to great advantage when needed for quick initial cooling, without danger of producing a cold running motor.

Another object of the present invention is to provide means whereby the louvers or shutters on the air blast control partition are so controlled as to enable the same to cause the blast of air from the cooling fan to either be directed in a converging manner upon the motor proper or to be directed in a diverging manner in a direction divergent to the position of the motor during the cooling operation.

Further, another object of the present invention is to provide means of engagement between the motor proper and the air blast controlling partition and its louver operating mechanism, that will readily follow the various vibrational and torsional movements of the motor as in "floating power", without perceptively interfering with the proper functioning of the louvers on the said partition.

Still another object of the present invention is to provide means for blocking off the whole or predetermined portions of the whole air blast from the cooling fan of a combustion motor and diverting said whole or portions of the whole air blast to the outside atmosphere, the remainder of the motor cooling air blast being directed into the motor zone for purposes of cooling the same.

Another important object of the present invention is to provide a method for maintaining proper running and operating temperatures for automotive combustion motors which consists broadly in controlling the air blast of the motor cooling fan, which ordinarily directs a blast of air directly onto the motor, in such a manner as to allow the whole of the air blast to strike the motor or only portions thereof in certain portions proportionate to given temperatures of the motor or to entirely block off the said air blast from the motor for purposes of obtaining quick initial heating of the motor up to the degree of heat which is considered to be the efficient running heat or temperature for the motor.

With these and other objects in view together with important details pertaining thereto, which will appear as the present invention is fully described and claimed, the invention consists further in the construction, combination and general arrangement of parts pertaining thereto.

In the accompanying drawings I have illustrated my invention in its preferred form, however it is understood various elemental changes may be made without departing from the spirit of the invention.

In the drawings:

Figure 1 is a fragmentary plan view, partly in section, of the front half of an automobile disclosing my invention as applied to the motor and radiator structures of the same.

Figure 2 a plan view similar to that shown in Figure 1, disclosing my invention on a larger scale and in greater detail, illustrating the louvered partition interposed between the air blast cooling fan and the motor proper, together with the thermostat control and its connection with the partition structure.

Figure 6 is a side elevation of the front end of an automobile which is somewhat fragmentary and sectional one side of the engine or motor hood having been removed, disclosing the air blast controlling partition positioned behind the cooling fan of the motor.

Figure 7 is a sectional view of the thermostat structure taken on the line 7—7 of Figure 2.

Figure 8 is a fragmentary view in elevation and taken on the section line 8—8 of Figure 6, illustrating the yielding connection of the air blast partition structure and the driving shaft of the cooling fan.

Figure 9 is a detail view in perspective of the back or rear portion of the fan drive shaft yielding connection as used in the air blast control partition shown particularly in Figure 8.

Figure 10 is a fragmentary sectional view taken on the line 10—10 of Figure 8 disclosing the collar structure of the yielding connector, for the fan shaft and partition.

Figure 11 illustrates the invention in plan disclosing the use of the same in combination with shutters or louvers positioned in the front of the radiator.

Figure 12 is a front elevation of Figure 11 that is somewhat fragmentary.

Figure 3:
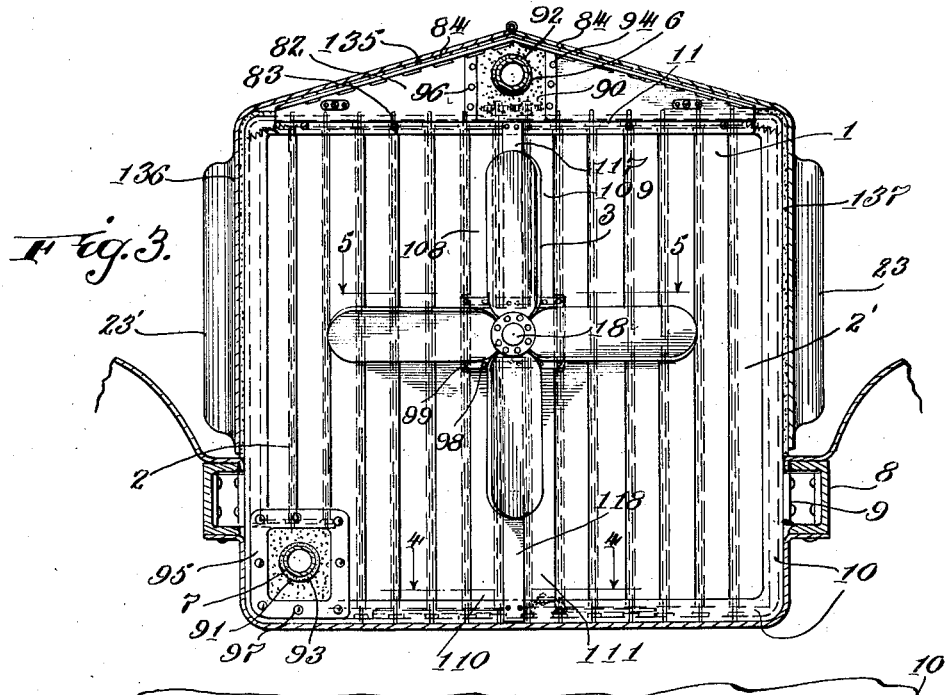
Figure 3 is a front elevation that is fragmentary and somewhat in section which may be taken on the line 3—3 of Figure 1.

Referring to the drawings by reference numerals, each of which represents the same or similar parts throughout the different views, Particular reference being made to Figures 1 and 2 of the drawings, the invention consists of a partition 1, having two sets of louvers 2 and 2', the partition being mounted in back of the air blast fan 3, broadly for the purpose of blocking off the whole or predetermined portions of the output of cooling air delivered under pressure by the air blast or cooling fan 3, and to fully control the amount of this air it is desired to have reach the combustion motor 5, of the automotive type, and its heat zone, thus controlling in a predetermined manner the amount of heat it is found necessary to absorb to operate the combustion motor efficiently by maintaining the same at a desired temperature. In the drawings the invention is shown as being identified with a water or liquid fluid automotive combustion motor cooling system, the radiator 4, which may be of any of the well known standard types, being positioned in the front of the fan 3, and having the usual tubular radiator connections with the motor as indicated at 6 and 7. The partition 1, which may be hereinafter referred to as the air blast control partition, however the same may also be referred to with equal correctness due to the character of its function and operation, as the air blast deflecting partition; may be secured to the chassis structure 8 as shown at 9 near the lower or bottom portion 10 of the partition 1. The upper structure 11, of the partition, may be braced and properly secured to the radiator 4 by means of the partition and radiator brackets 12 and 14 respectively, the same being linked or attached to each other by the connecting rods or braces 15.

As may be noted particularly from the illustration as shown in Figure 1 of the drawings, that the fragmentary portion of the automotive vehicle 16, as shown here, is substantially a standard layout of the universal design of the automotive portion of the self-propelled vehicle so widely used and practically adopted as standard design today by the automobile industry, particularly where water cooled motors are used. In this instance a water cooling radiator 4 is located at the front of the vehicle, at the back of the radiator 4 is located an air fan 3, thence in the rear of the air fan 3, is located the motor 5, the radiator in turn being connected to the motor by the radiator connections 6 and 7. The rear portion of the radiator, the air fan and the motor proper are all properly protected from the outside elements, by the motor housing or hood structure 17. The radiator, air fan and motor all being substantially in line for purposes of getting the greatest amount of efficiency from a motor cooling standpoint, from the fan and the blast of cooling air it delivers to the motor, a greater portion of which has been originally drawn through the radiator. Thus the air fan functions in a two fold manner or capacity, in this instance, assisting in the cooling function of the radiator and thence delivering a blast of cooling air to the motor and its heat zone for purposes of cooling the same.

Regardless of the fact that this general arrangement of the cooling units for an automotive combustion motor have been adopted as a standard arrangement by the majority of manufacturers of automobiles today, and over twenty million automobiles are using this general arrangement or system today in the United States, this system of cooling and heat control of the motor functions in such a manner that it is not efficient in fully controlling the heat of the motor when the same meets up with either hot or cold running conditions, and is not provided to give quick initial heating nor quick initial cooling.

It is the purpose of the present inventor, in making the explanation above to focus attention on, and to fully emphasize the fact that it is not necessary to disturb the general arrangement of structure units referred to above, but rather, in the application of the invention in the present case, to co-operate with the automotive industry and its manufacturers, by the application of my invention to their present cooling system arrangement, as stated above, without disturbing the general design of this particular cooling system, and yet overcoming the present inefficiencies of this system in regards to the proper control of the temperature of the automotive motor.

The difficulty with this cooling system under discussion, has been found by the average motorist, to be with the volume of cooling air delivered by the fan member against the motor of absorption of the motor heat. With this type of system, in the winter time the fan is continuously delivering a blast of cooling air under pressure to the motor and its heat zone, regardless as to whether the motor is hot or cold. To off-set this condition, the automotive manufacturers use an air fan of minimum size, which is more or less favorable to the operation of the motor in the winter or cold months. In the summer or hot months of the year this same size air fan will run into difficulties, in that under unusual load conditions the motor will heat up due to a lack of a sufficient amount of cooling air. As may be readily deducted from this explanation, the reverse condition would result as to hot and cold climatic conditions if the air fan were of an oversize type.

In the use of the present invention an oversize air fan may be used to great advantage, providing at all times a safety margin of cooling air to meet abnormal motor heat conditions, and to give the motor quick initial cooling when necessary. Quick initial heating is also provided for the motor under cold operating conditions by the present invention regardless of the use of an oversize air fan.

Reference has been made hereinbefore about the air deflecting partition 1 being mounted on and fixed to the chassis of the automobile as illustrated in the present disclosure of the application of this portion of the invention. It should be fully understood however, that the deflecting partition 1 may be mounted in a suitable manner on the motor proper and allowed to move with the vibrations of the motor, or torsional movements of the motor such as those set up where "floating power" is used.

The air blast fan member 3, may be mounted on the fan shaft 18, which in turn carries the fan belt pulley 19, the pulley being driven through the fan belt member 20 from any source of power supply from the motor proper, such as through the drive pulley 21, see Figure 6 of the drawings. As may be noted from the drawings, the air fan drive shaft 18 passes directly through the louvered partition member 1, as does also the radiator connections 6 and 7. Provision has been made in the partition structure at the passage points of these members through the partition, whereby the same will have comparative free movement at these points due to the motor movements, without allowing for the free admission of the fan blast air therethrough. This feature will be more fully hereinafter described.

The side walls 22 and 22' of the motor hood structure 17 may be provided as shown with vertical openings 23 and 23' for purposes of freely disposing of the deflected cooling air which has been prevented from passing the air deflecting partition 1 and its respective sets of louvers 2 and 2'. It is fully understood these vertical openings 23 and 23' may be of any desired number and size or shape and that the same may be provided with louvers for purposes of fully controlling the amount of this cooling air, that has been deflected, that passes therethrough. It is also understood that these openings may be directed towards the front of automotive vehicle instead of towards the rear of the same as shown on the present drawings. At certain high speeds of the motor vehicle cooling air from the outside atmosphere may be drawn into the motor housing by way of the openings 23 and 23' due to both the speed of the automobile and the action of the air fan 3 setting up a sufficient vacuum under the motor hood when the air deflecting partition louvers are open, thus allowing additional cooling air to reach the motor and its heat zone.

For purposes of controlling the opening and closing of the partition louvers 2 and 2' in a predetermined manner so that the heat of the motor may be maintained at a desired efficient degree by controlling the volume of cooling air that reaches the same, a thermostat 30 is provided, illustrated as being positioned in the head of the motor block at 31.

Referring to Figure 7 of the drawings, the thermostat 30 is of the external closed cup and internal bellows type, the cup and bellows structures being indicated by reference numerals 32 and 33 respectively. The space 34, between the inner surface of the cup and the bellows being filled with mercury 35, or any volatile liquid, the mercury expanding and contracting due to the variations of heat degrees of the liquid fluid 36 used as a cooling means for the motor. The thermostat 30 may be mounted on the outside of the motor block at a convenient location where the same would be caused to function by the heat of the motor. Upon the expansion of the mercury or volatile liquid 35, the bellows is caused to collapse, thus moving the pin or plunger 40 in an upward direction. The upper end of which carries a pin 41 engaged in the slot 42 of the lower lever portion 43 of the bell crank lever 44, the same being pivoted or fulcrumed at 45 to the bracket 46 mounted on the thermostat cover 47. It is understood the thermostat liquid 35 is provided with characteristics whereby the same is only caused to expand in a predetermined manner by certain degrees of heat of the motor.

The upper lever portion 48 of the bell crank lever 44 is pivotally engaged at 49 to the connecting rod 50, which in turn is pivotally engaged at its opposite end at 51 to the master gear operating arm member 52.

Figure 15:
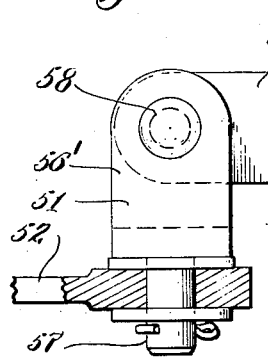
Figure 15 is an enlarged detail view of the pivoted connector mounted on the partition master gear lever for driving the louver pinions or small gears.
Figure 16:
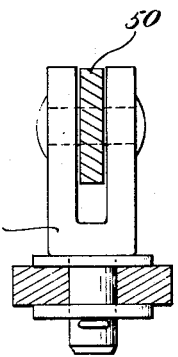
Figure 16 is a rear elevation of the same, or a side elevation of the connector as shown in Figure 15.
Figure 17:
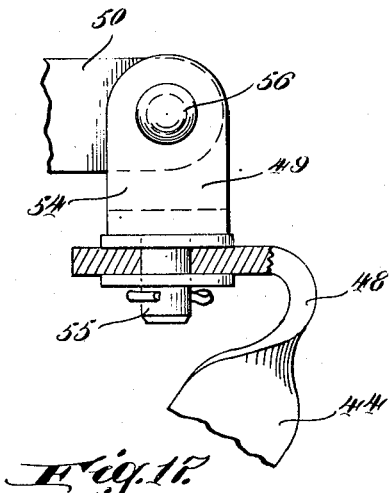
Figure 17 is a detail fragmentary view of the pivoted connector as used on the upper end of the thermostat bell crank lever.

Referring to Figures 15, 16 and 17 of the drawings which disclose detail figures of the pivotal points 49 and 51, it may readily be seen that these pivotal points are so designed as to provide substantially free movement of the motor proper, on which the thermostat is mounted, in relation to the air control or deflecting partition member 1 and its louver operating mechanism 53. The bell crank lever 44 and its upper portion 48 is engaged to the pivot bracket 54 by means of the downwardly depending pin structure 55, the upper portion of the bracket 54 is pivotally engaged to the bracket connecting rod 50 by means of the pin member 56. The master gear operating arm member 52 is engaged to the opposite end of the connecting rod 50 through the pivot pin 57 the pivot bracket 56' and the connecting rod pivot pin 58.

Referring to the louver operating mechanism 53 in detail, the same consists of the master gear member 60, and its control or operating ram member 52, both being keyed or fixed to the short vertical shaft or pin 61, the pin and gear structure being supported on the bracket 61'. The master gear in turn meshing with the louver operating pinion 62, which in turn meshes with and drives the other louver operating pinion 63. The louver operating pinions 62 and 63 are each mounted on the louver carrying rods 62' and 63' respectively and are fixed thereto. Mounted on and fixed to these rods 62' and 63' and controlled by the movement of the louver actuating pinions 62 and 63, are extension arms 64 and 65 respectively, the opposite ends of which are pivotally engaged to the louver arm connecting rods 66 and 67 respectively. These rods in turn have pivotally connected thereto the louver controlling extension arms 68 and 69 of the two sets of louvers 2 and 2' respectively. The pivotal connections being indicated at 70 and 71 respectively in relation to the two sets of louver members. The two outside opposite ends of the louver arm connecting rods 66 and 67 have each connected thereto coil spring tension members 72 and 73 at 74 and 75 respectively. The opposite ends of these springs are each in turn engaged to the side wall structure of the air deflecting partition at 76 and 77 respectively. The purpose of these springs being to provide a takeup for any lost motion in the deflector louver structure and to also assist the thermostat louver control and actuating means to close the louvers and to maintain them in closed position when the heat degree of the motor requires it.

In the drawings the louver members 78 and 79 of the two sets of louvers 2 and 2' respectively, are shown as being closed in the usual full lines, and shown in their full open position in Figure 2 in very fine dotted lines. The fine dotted arrows in this view indicate the direction taken by the blast of cooling air sent through the louvers by the air fan. As this is an important feature of the invention it is well to note that upon the full opening of the louvers, the blast air is caused to be directed towards the motor and its heat zone in a converging manner, for the purpose of obtaining the greatest effectiveness possible from the blast of air delivered by the fan as a means of absorbing heat from the motor under unusual heat producing operation of the same. The two sets of louvers, when only partially open also tend to direct this same blast of cooling air from the fan in a diverging manner, when only partial cooling is necessary.

The louvers 78 and 79 of the louver groups 2 and 2' respectively are carried and supported on the louver rod members 80 and 81 respectively, the same being pivoted in the upper and lower portions or frame work of the air deflecting partition member 1 as shown in the various views.

The upper structure 11 of the partition 1 is provided with a super structure or upwardly extending shield portion 82 which may be fixed to the partition by the rivets 83. The shield 82 in this instance is of an inverted V shape at its top portion 84 for purposes of allowing the same to conform to the shape of the motor hood structure or housing 17. The purpose of the shield being to assist in completely blocking off all air from the motor compartment behind the partition member 1, except that portion of the cooling air it is desired to have pass through the louvers of the partition.

Referring particularly to Figures 3 and 6 of the drawings, it will be noted that the radiator connections 6 and 7 pass through the partition structure which separates the motor from the fan. In this instance the partition structure is rigidly mounted on the chassis of the vehicle, whereas the motor unit is supported in a yielding manner on the chassis, thus allowing relative movement of the motor to the partition member 1. As the radiator connections between the motor and the radiator pass through the partition 1, and have a relative movement with the movement of the motor it is found necessary to provide some means at the point of passage of these connections through the partition 1 to allow this movement of these connections to take place in a substantially free manner without allowing fan blast cooling air to pass through the partition at these points, and to keep these passage points closed. In this respect the same provision of course is found necessary and very desirable for the drive shaft of the air fan where the same passes through the partition 1 substantially at its center. The specific provision used in this instance for the fan shaft will be hereinafter more fully described.

With reference to the radiator connections as set forth in the above paragraph, these connections 6 and 7 pass through and are engaged by a yielding portion of the partition structure 1, in the form of elastic or yielding sheets of material such as rubber or the like, however loosely mounted canvas or the like may be used to great advantage for the purpose in mind, the sheets of elastic material are indicated at 90 and 91, the same being provided with a reinforcement collar that may be integral therewith and indicated at 92 and 93. The elastic or yielding connections of sheet material 90 and 91 may be fastened to the frame of the partition by overlying metal frames 94 and 95, and held securely thereto by rivets or bolts 96 and 97 respectively. As may be readily seen this type of yielding or elastic partition passage will allow for substantially free movement of the radiator connections 6 and 7 without admitting harmful quantities of fan blast air therethrough, which would have a tendency to partially offset the purpose of the air deflecting partition member 1.

Referring particularly to Figures 8, 9 and 10 of the drawings in which the elastic or yielding connector 98 between the fan drive shaft and the air deflecting partition 1 is shown in detail. The yielding connector 98 is provided to meet the condition set up by passing the drive shaft 18 of the fan member through the deflector 1, this condition is similar to that set up where the radiator connections or tubing has been passed through the partition member 1, and that is the passage of cold air, that is uncontrolled, through the opening around the drive shaft 18, which opening has to be large enough to provide sufficient clearance for the free movement of the fan drive shaft due to the relative movement or vibration of the motor and the fan shaft to the comparatively fixed air deflecting partition member 1.

To this end the elastic connector member 98 is provided with a supporting frame 99, to which the yielding or elastic connector 98 is fixed as shown by means of the superimposed frame member 100 and the screws or rivets 101. The connector is provided with a collar 102, which may be either integral with the connector as shown or attached thereto, for purposes of more securely engaging the connector to the fan drive shaft 18 and in the capacity of a reinforcement at this point. The connector 98 and its supporting frame 99, is mounted within the deflector opening 103, by means of the louver rod members 80 and 81, the same being passed through the holes or openings 104 and 105 of the connector frame member 99. The louvers 2 and 2' being cut away, as shown particularly in Figure 8, at 106 and 107 to allow proper clearance for the frame structure 99 and free operative movement of these louvers at this point. The two upper center louvers 108 and 109 each are provided with lower bearings in the rib 112 of the connector frame 99. The two lower center louvers 110 and 111 are each provided with upper bearings in the rib 114 of the connector frame 99. Both of the said sets of upper and lower louvers having said bearings in the frame ribs 112 and 114 at 115 and 116 respectively as indicated.

The air deflector member 1 is provided with vertical upper and lower stiffening or reinforce members 117 and 118, the same being fixed to the frame structure 99 of the said yielding connector and the frame of the deflector member 1. These reinforce members serve for a three fold purpose, i. e., as a stiffening means for the deflector 1, a substantially rigid support for the yielding connector member 98 and also for the important function of preventing harmful quantities of cooling air from passing through the openings 119 and 120 in the air deflector 1, between the two upper center louvers 108 and 109, and the two lower center louvers 110 and 111 respectively.

Figure 4:
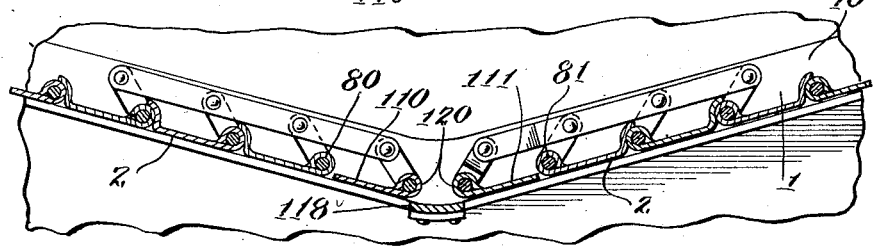
Figure 4 is a sectional view taken on the line 4—4 of Figure 3.
Figure 5:
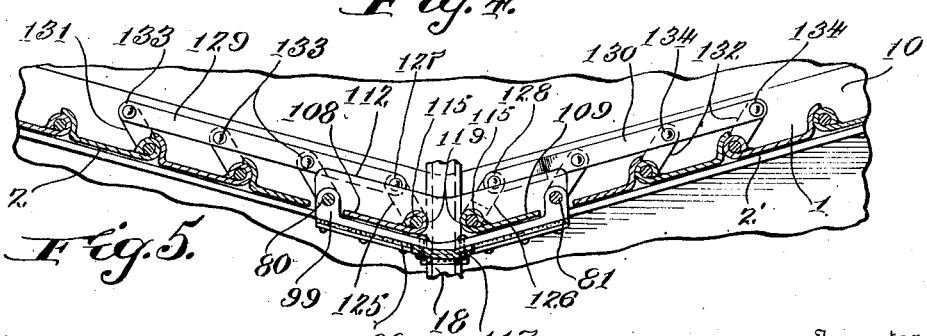
Figure 5 is another sectional view taken on the line 5—5 of Figure 3.
Figure 14:
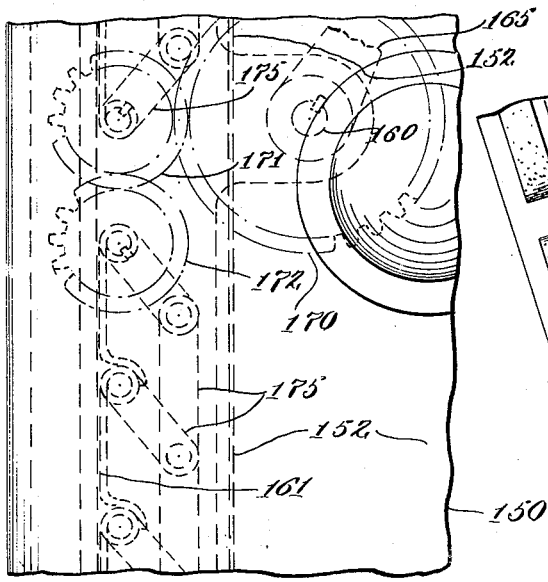
Figure 14 is a fragmentary view in plan on an enlarged scale of the louvers and their operating means as used in the radiator structure as shown in Figure 11 of the drawings.
Figure 13:
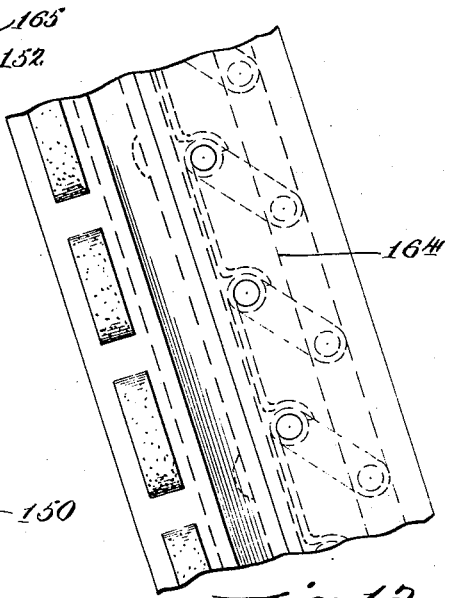
Figure 13 is an enlarged fragmentary view of a portion of the louver operating means and its connections with the louvers of the air blast control partition as used in the combination form of the invention when used with radiator shutters or louvers as disclosed in Figure 11.

As the two lower center louvers 110 and 111 are each separated from the main operating means for the two sets of deflector louvers 2 and 2', due to the opening provided for the yielding connector 98 in the air deflector louver structure, special and separate means for the proper operation of the same has been provided. Referring to Figures 4 and 5 of the drawings, the lower center louvers 108 and 109 are each provided with extension arms or links 125 and 126 respectively, the same being pivotally engaged to the connecting rods 129 and 130, at 127 and 128, respectively. The link connecting rods 129 and 130 are each respectively connected to the louvers 2 and 2', as shown, through the links or louver extension arms 131 and 132, respectively, the same being in turn pivotally connected at 133 and 134 to the actuating connecting rods 129 and 130, respectively. Thus these lower center louvers 110 and 111 are operated indirectly by the main louver control means positioned at the upper structure of the air deflecting partition 1, through the actuated louvers 2 and 2', in the manner as shown. This arrangement, as may be readily seen, allows for the proper control of substantially the whole surface of the partition member and its louvered structure. Thus providing for greater effectiveness of the partition member as an air control means, by enabling substantially the whole partition surface to be made up of effective operating air controlling louvers.

The inverted V shaped top surface 135, and the side surfaces 136 and 137 of the partition member 1, may act as an auxiliary or secondary support for the motor hood structure 17. It being understood that this partition member may be of any desired shape to meet the preferred design of the motor hood.

It will be noted particularly from Figures 1 and 2 of the drawings that the air deflecting partition member 1 is V shape in structure, the lower part of the V being near the center of the air fan, and the legs of the V moving away from the air fan blades, thus providing less resistance to the cooling air that is deflected to the atmosphere, and presenting receding low resisting air deflecting surfaces for the blast of cooling air from the fan member 3, however it is not the purpose of the inventor to limit himself to this V shaped partition as it is fully understood that the same may be in the form of an arc or any desired shape. The partition having a design as shown forming air spaces 140 on each side of the fan member, whereby these air spaces increase in area as the same moves outwardly and towards the outer periphery of the cooling fan, is preferable. Thus allowing for the provision of an increasing air deflecting space where there is an increasing volume of cooling air.

Referring back to the thermostat 30 and its connection with the master gear 60, it is understood that the inventor may use a flexible wired tubing, such as Bowden wired tubing that is flexible for the purpose of actuating the master gear 60 from the thermostat 30.

It is also understood that the air control partition member 1 may also be applied to automotive vehicles in the form of an accessory in desirable designs.

In Figures 11 and 12 of the drawings, the invention is shown in a different form and/or in combination with radiator shutters or louvers of a novel arrangement.

In this instance it is the purpose of the inventor to control the amount of air coming into contact with the front of the radiator, and thus control the cooling effect thereof, and at the same time and in a predetermined manner control the amount of cooling air delivered by the cooling fan that reaches the motor and its heat zone, thus providing a dual motor heat control whereby both the liquid fluid cooling means and the air cooling means may be simultaneously controlled to increase the effectiveness of the whole motor cooling system, producing unusually quick initial heating of the motor in cold weather or quick initial cooling in hot weather.

Referring to Figures 11, 12, 13 and 14 of the drawings, to this end, the means for controlling the cooling air delivered by the air blast fan is similar to that described hereinbefore for this purpose alone, i. e., for controlling only the cooling air from the fan member.

The present structure consists broadly in an automotive vehicle 150, having a motor 151, a liquid fluid cooling radiator 152, an air blast fan 153 for delivering cooling air to the motor, an air controlling and deflecting partition 154 interposed between the said air fan and the said motor, the air deflecting partition 154 having two sets of air controlling louvers 163 and 164, the said louvers being actuated by the thermostat 155, and the louver actuating means 156, like in the previously described apparatus. Connected to this louver actuating means at the pivotal point 157 of the master gear extension or actuating arm is the connecting rod member 158, this rod at its opposite end is pivotally connected to a master gear extension arm 165 at 159. The front of the radiator 152 is provided with louvers 161, these louvers in turn being actuated by the gear mechanism indicated at 160, which is like that used in the hereinbefore described louver operating gear mechanism. The same consisting broadly of a master gear 170, driving a pinion gear 171, the pinion gear in turn driving another pinion gear 172, these pinion gears in turn actuating the radiator louvers through the link and connecting rod mechanism indicated at 175.

In this modified form of structure the side walls of the motor hood may be provided with openings 162, having a function similar to that described for the openings 23 and 23' in the previously described form of structure, as shown in Figures 1, 2 and 3 of the drawings. It being fully understood that these openings 162 may be supplied with louvers for controlling the air passing therethrough and also that the same reference to variation of structure and function as applied to and referred to in the previous description of the preferred form of structure is also applicable to these openings in this modified form.

As may be readily seen in this instance the radiator louvers together with the louvers of the partition member will both be actuated in a cooperative and simultaneous manner by and through the thermostat and its louver actuating mechanism, with all the advantages as hereinbefore described.

I have thus described my invention specifically and in detail, in order that its nature and operation together with its construction may be fully understood; however the specific terms herein are used descriptively rather than in a limiting sense, and the scope of the invention is defined in the claims.

What I claim and desire to secure by Letters Patent is:

1. In an automotive combustion motor having cooling means for the same in the form of a radiator and air fan, thermostatically controlled means positioned between the air fan and the motor and also at the front of the radiator, the said means between the air fan and the motor and the means positioned at the front of the radiator being interconnected one with the other for controlling said cooling means in a co-operative and simultaneous manner.

2. An automotive combustion motor having co-operative liquid and air cooling means, means for thermostatically controlling both of said means in a simultaneous manner, for purposes of obtaining quick initial heating or cooling of the motor, said means comprising separate louvered partitions positioned before and after the air cooling means the louvers of each separate partition member being interconnected for the purpose of allowing the louvers of each partition to open and close at substantially the same time to provide for quick heat exchange.

3. An automotive combustion motor having a water cooling radiator and an air fan, a grilled partition positioned between the fan and the motor, the fan delivering a blast of cooling air to the motor, the partition comprising louvers for controlling the cooling air before it reaches the motor, a louvered cover positioned in front of the radiator, interconnecting means between the louvered cover and the louvers of the grilled partition for moving the louvers of the respective cover and partition members in unison.

4. An automotive combustion motor having cooling means therefore in the form of a radiator and air fan, means positioned in the front of the radiator comprising opening and closing elements, additional means interposed between the fan and the motor comprising opening and closing elements having interconnecting means for opening and closing both of the said elements simultaneously, the same providing means for simultaneously controlling the cooling function of the radiator and the air fan.

5. An automotive motor, comprising a radiator and air fan for delivering cooling air to the motor, a grilled partition interposed in the path of the cooling air, the same having air controlling louvers, forming means for controlling the amount of cooling air to reach the motor, a louvered cover positioned in juxtaposition to the radiator, the said louvers forming means for controlling the cooling function of the radiator, the louvers of both the radiator and the partition having interconnecting means for opening and closing the louvers in a simultaneous manner, for simultaneously controlling the cooling function of both the radiator and the fan in a cooperative manner.

6. In a temperature control system for automobile engines of the internal combustion type, the combination of a water cooling radiator, an air circulating fan behind said radiator, a hood extending from the radiator and over the air circulating fan, a supporting frame having a contour conforming to the interior of said hood, secured in spaced relation with the rear of the radiator, partition forming members secured to said supporting frame adapted to cooperate with said hood and form a heat accumulating compartment at the rear of said radiator in which the air circulating fan of the engine will operate, and thermostatically controlled louvers carried by said partition forming members for controlling the circulation of air through said compartment and the radiator.

7. In a temperature controlling system for an internal combustion engine, the combination of an air cooled radiator through which a cooling fluid for the engine will flow, a hood extending from said radiator and over the engine, an air circulating fan driven by said engine disposed behind said radiator, a vertically disposed partition behind said fan and cooperating with said hood and radiator to form a heat accumulating compartment and prevent a free circulation of air through said radiator, and ventilating means carried by said hood in front of said partition for controlling the circulation of air through the radiator.

8. In a temperature controlling system for an internal combustion engine, the combination of an air cooled radiator through which a cooling fluid for the engine will flow, a hood extending from said radiator and over the engine, a vertically disposed partition behind said radiator and cooperating with said hood and radiator to form a compartment with the hood and radiator and prevent a free circulation of air through said radiator, and a hinged ventilator on each side of said hood in front of said partition for controlling the circulation of air through the radiator.

PORTER H. FLAUTT.